United States Patent [19]

Akiyama

[11] Patent Number: 5,196,254
[45] Date of Patent: Mar. 23, 1993

[54] CUSHIONING MATERIAL

[75] Inventor: Hiroyuki Akiyama, Hiratsuka, Japan

[73] Assignee: JSP Corporation, Tokyo, Japan

[21] Appl. No.: 361,562

[22] Filed: Jun. 5, 1989

Related U.S. Application Data

[63] Continuation-in-part of Ser. No. 75,973, Jul. 21, 1987, abandoned.

[30] Foreign Application Priority Data

Jul. 25, 1986 [JP] Japan .................... 61-114159
Jul. 21, 1987 [EP] European Pat. Off. ........... 87306440

[51] Int. Cl.$^5$ ................................. B32B 3/12
[52] U.S. Cl. ............................ 428/178; 428/166;
428/172; 428/179; 428/474.4; 428/476.3;
428/476.9; 493/967
[58] Field of Search ............ 428/178, 69, 72, 36,
428/76, 122, 315.5, 476.1, 172, 426.9, 474.4,
476.3, 188, 179, 156, 166, 174; 493/967, 968

[56] References Cited

U.S. PATENT DOCUMENTS

| | | | |
|---|---|---|---|
| Re. 29,340 | 8/1977 | Matsunami et al. | 428/216 |
| 3,843,479 | 10/1974 | Matsunami et al. | 161/165 |
| 3,946,089 | 3/1976 | Furukawa et al. | 260/857 PG |
| 4,133,802 | 1/1979 | Hachiboshi et al. | 528/502 |
| 4,314,865 | 2/1982 | Ottaviano | 156/145 |
| 4,412,879 | 11/1983 | Ottaviano | 156/145 |
| 4,486,507 | 12/1984 | Schumacher | 428/476.1 |

FOREIGN PATENT DOCUMENTS 864512 2/1971 Canada.
2396646 2/1979 France.

Primary Examiner—Donald J. Loney
Attorney, Agent, or Firm—Stephen F. K. Yee

[57] ABSTRACT

A cushioning material is disclosed which includes two laminated films between which a plurality of air tight cells are formed. Each of the films is composed of an intermediate layer formed of an aromatic polyamide resin and two surface layers formed of a polyolefin resin and provided on both sides of the intermediate layer, wherein the aromatic polyamide resin is one obtained by polycondensing m-xylylenediamine with an aliphatic dicarboxylic acid selected from the group consisting of adipic acid, terephthalic acid, isophthalic acid and mixtures thereof, and the polyolefin resin is a member selected from the group consisting of low density polyethylenes, ethylene/α-olefin copolymers and mixtures thereof.

4 Claims, 2 Drawing Sheets

FIG. I
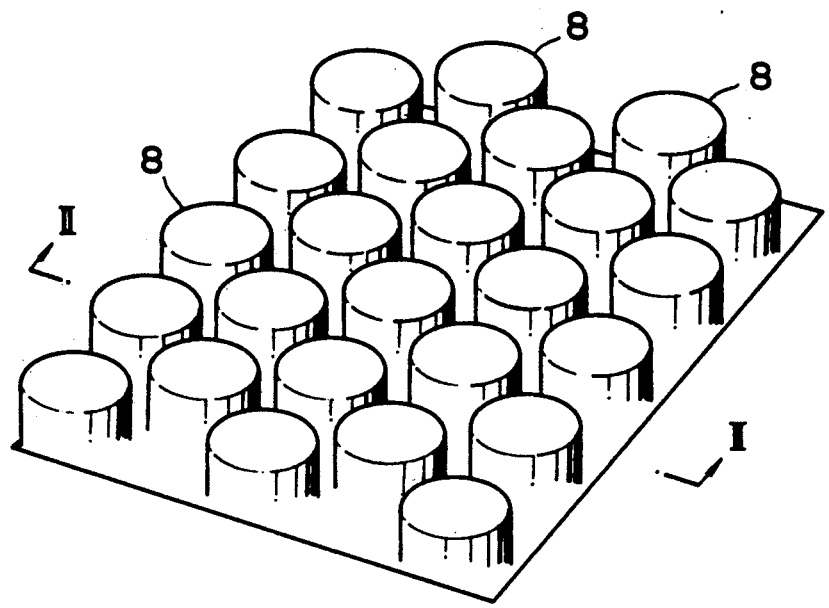
FIG. 2
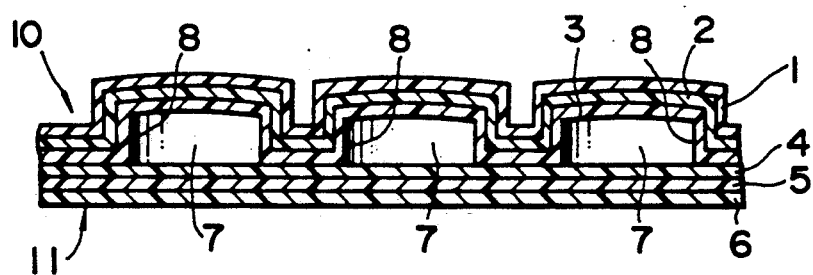
FIG. 3
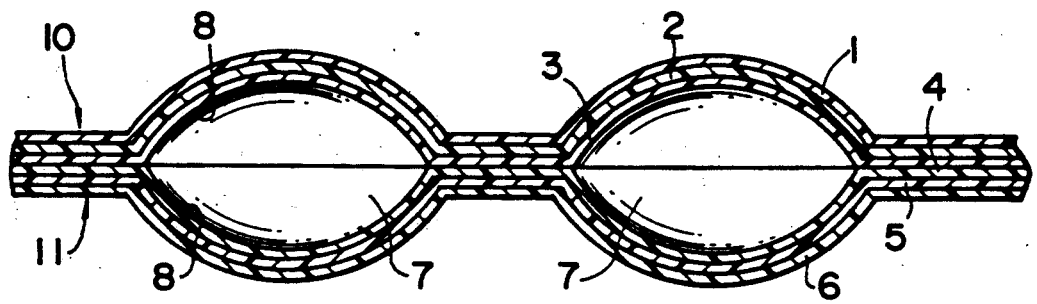

CUSHIONING MATERIAL

CROSS-REFERENCE TO RELATED APPLICATION

This application is a continuation-in-part of U.S. Ser. No. 075,973 filed Jul. 21, 1987, now abandoned.

BACKGROUND OF THE INVENTION

This invention relates generally to a laminated plastic material having air-tight cell or cells and useful for cushioning or shock absorbing applications.

Cushioning material such as a cushioning sheet composed of two laminated films and having a plurality of air-tight cells therebetween is well known and is widely used in, for example, packaging products or padding furnitures. Conventional cushioning materials, which are generally formed of a polyolefin such as a low density polyethylene, have a problem because they are relatively poor gas barrier materials. Thus, for example, when such cushioning materials are used under pressurized conditions, air entrapped in the cells is gradually forced out of the cells so that the cushioning property is deteriorated. This is especially so when the pressed cushioning materials are also subjected to a great change of temperature.

BRIEF SUMMARY OF THE INVENTION

The present invention has been made in consideration of the problem of the conventional cushioning material. In accordance with the present invention there is provided a cushioning material comprising two, first and second composite films each including an intermediate layer formed of a polyamide resin and a surface layer laminated on each side of said intermediate layer and each formed of a polyolefin resin, at least one of said first and second composite films being formed to provide one or more discrete embossments, and said first and second composite films being bonded to form a substantially unitary structure and to seal said embossments so that one or more air-tight cells are defined between said first and second composite films, said polyamide resin including an aromatic polyamide resin obtained by polycondensing m-xylylenediamine with an aliphatic dicarboxylic acid selected from the group consisting of adipic acid, terephthalic acid, isophthalic acid and mixtures thereof, and said polyolefin resin being a member selected from the group consisting of low density polyethylenes, copolymers of ethylene and an α-olefin and mixtures thereof.

The cushioning material according to the present invention has excellent gas and moisture vapor barrier property and, moreover, exhibits excellent resistance to water, oil and heat. It also has a high mechanical strength.

BRIEF DESCRIPTION OF THE DRAWINGS

Other objects, features and advantages of the present invention will become apparent from the detailed description of the preferred embodiments of the invention which follows, when considered in light of the accompanying drawings in which:

FIG. 1 is a perspective view diagrammatically showing one embodiment of cushioning material according to the present invention;

FIG. 2 is an enlarged, cross-sectional view taken along line II—II in FIG. 1;

FIG. 3 is a sectional view similar to FIG. 2 showing another embodiment according to the present invention;

DETAILED DESCRIPTION OF THE PREFERRED EMBODIMENTS OF THE INVENTION

Figure 4:
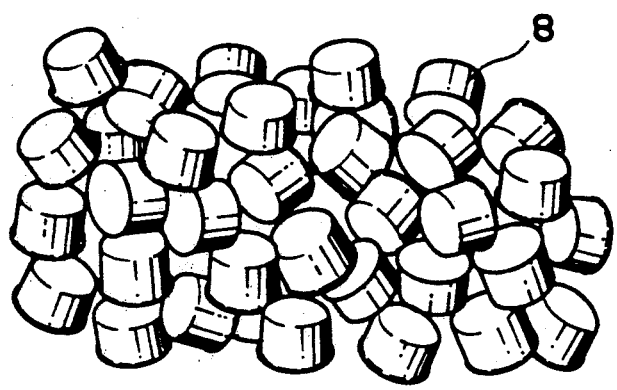
FIG. 4 is a perspective view diagrammatically showing a further embodiment according to the present invention.

FIGS. 1 and 2 depict a cushioning material in the form of a sheet according to the present invention. The cushioning material is formed from two, first and second composite films 10 and 11. The first composite film 10 is composed of an intermediate layer 2 sandwiched between two overlying surface layers 1 and 3 and so formed as to provide a plurality of discrete embossments 8. The second composite film 11, too, is composed of an intermediate layer 5 sandwiched between two overlying surface layers 4 and 6. The first and second films 10 and 11 are laminated to form a substantially unitary sheet and to seal the embossments 8 of the first film 10. The sealed embossments 8 define air-tight cells 7.

The surface layers 1, 3, 4 and 6 of the first and second films 10 and 11 are each formed of a polyolefin resin such as a polyethylene, a polypropylene or an ethylene-vinyl acetate copolymer. Polymers obtained by modifying these polyolefins with a graf-polymerizable monomer such as acrylic acid or maleic anhydride may be also used for the surface layers 1, 3, 4 and 6. The surface layers 1, 3, 4 and 6 preferably have a thickness (before embossing) of 5-500 μm, more preferably 10-250 μm.

It is preferable to use, as the polyolefin resin, a low density polyethylene, a copolymer of ethylene and an α-olefin, such as butene-1, or a mixture thereof. Especially preferred is the use of 30-70% by weight of a low density polyethylene and 70-30% by weight of an ethylene/α-olefin copolymer. The copolymer preferably has an α-olefin content of 1-15 mole %.

The low density polyethylene, which generally has a density of 0.910-0.935 g/cm$^3$, has a relatively high impact strength and provides excellent bonding between the composite films 10 and 11. The other mechanical strengths such as tensile strength, elongation and modulus of the low density polyethylene are not high. The ethylene/α-olefin copolymer, on the other hand, is relatively high in tensile strength, elongation and modulus and has excellent formability in embossing. The copolymer, however, fails to provide excellent bonding between the composite films 10 and 11.

When such two polymers are used jointly in combination, there are obtainable very good mechanical properties, formability in embossing and bonding between the composite films 10 and 11. Moreover, the mixed polymer has such unexpected properties that it permits the use of a high degree of vacuum and a wide range of molding temperatures during vacuum molding for a formation of embossments. Therefore, the cushioning material having well-defined cells can be prepared effectively and efficiently.

The intermediate layers 2 and 5 of the first and second films 10 and 11 are each formed of a polyamide resin. Examples of suitable polyamide resins include aliphatic polyamides such as nylon66, nylon610, nylon10,10, nylon 6, nylon4, nylon9 and nylon11, aromatic polyamides such as poly(m-phenyleneisophthalamide), poly(m-xylyleneadipamide) and poly(m-xylylenesebacamide), and aliphatic/aromatic polyamides such as poly(xylylene/hexamethyleneadipamide).

For reasons of remarkable gas or moisture vapor barrier property and excellent formability of embossments, it is preferable to use, as the intermediate layer, an aromatic polyamide obtained by polycondensing m-xylylenediamine with an aliphatic dicarboxylic acid selected from adipic acid, terephthalic acid, isophthalic acid and mixtures thereof.

While an aliphatic polyamide such as Nylon 6 has excellent mechanical strengths such as tear strength, impact strength and elongation, the gas barrier property and modulus thereof are poor. In contrast, the above-mentioned aromatic polyamide has excellent gas barrier property and modulus though its mechanical strengths, especially impact strength and elongation, are very low. Therefore, in spite of its excellent gas barrier property, the aromatic polyamide would not be expected to be usable for the preparation of cushioning materials. It has been found, however, the aromatic polyamide can be suitably used as the intermediate layer of the cushioning materials. The reason for this is considered to be because the aromatic polyamide is lipophilic and is compatible with the polyolefin layers provided over the both sides thereof.

In addition to the improved gas barrier property, the aromatic polyamide exhibits far superior formability in embossing as compared with the aliphatic polyamide. This is surprising since the elongation of the aromatic polyamide is considerably lower than the aliphatic polyamide. It has been found that the expanded walls of the embossments are uniform in thickness when the aromatic polyamide is used. In contrast, the thickness of the wall of the embossed portions of the cushioning material obtained by vacuum molding the composite film having an intermediate layer formed of the aliphatic polyamide is not uniform, i.e. both excessively thin portions and thick portions are present.

When the aromatic polyamide is used in conjunction with the aliphatic polyamide, especially Nylon 6, the resulting cushioning material exhibits very good mechanical properties and gas barrier properties. Moreover, the formability in embossing becomes further improved as compared with the case where the two polyamides are used separately. Thus, the cojoint use of the two kinds of polyamides provides an effect that could not be expected from a mere addition of their inherent properties and represents a preferred embodiment of the present invention. Preferably, the aliphatic polyamide such as Nylon 6 is used in an amount of 10–90% by weight based on the aromatic polyamide resin.

It is also preferable to use (1) a polyamide obtained by polycondensing m-xylylenediamine with a mixture of dicarboxylic acids composed of 55–70 mol % of an aliphatic dicarboxylic acid, 20–30 mol % of isophthalic acid and 5–20 mol of terephthalic acid, wherein the total amount of the isophthalic acid and terephthalic acid in the mixture is in the range of 30–45 mol % or (2) a blend of 40–60% by weight of the polyamide (1) with 60–40% by weight of of a second polyamide obtained by polycondensing m-xylylenediamine with an aliphatic dicarboxylic acid. The aliphatic dicarboxylic acid may be, for example, adipic acid. The intermediate layer preferably has a thickness (before embossing) of 5–250 μm, more preferably 10–100 μm.

FIG. 3 depicts another example of the cell structure of the cushioning sheet of this invention, in which two embossed composite films 10 and 11 are laminated to provide a unitary sheet. The embossments 8 which are semispherical in shape are combined in back-to-back fashion to form hermetically sealed cells 7. In the present invention, the shape or configuration and the arrangement of the cells 8 are not limited to the above-described specific embodiments. The cushioning sheet may have any desired cell configuration and arrangement.

The cushioning material of this invention is not limited to a sheet only. As shown in FIG. 4, the cushioning material may be in the form of "air cap". The "air cap" type cushioning material shown in FIG. 4 may be obtained by simply severing the cushioning sheet of FIG. 1 at its sealed portions into pieces 8 each having one air-tight cell.

Figure 5:
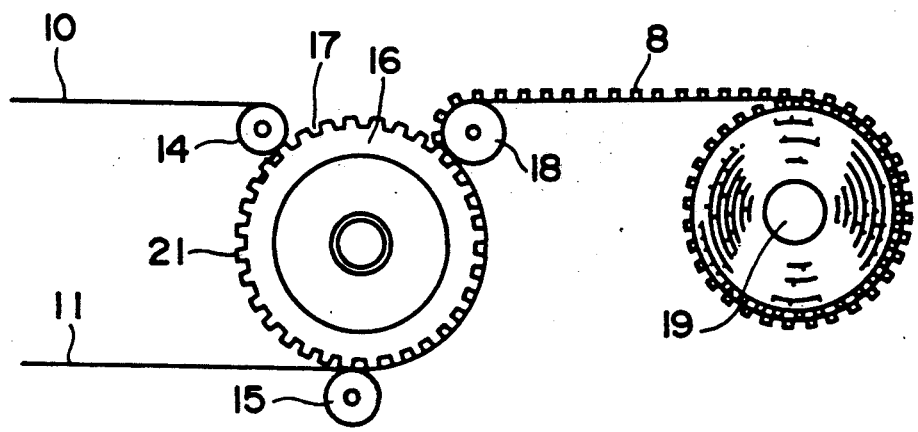
FIG. 5 is a schematic illustration showing an apparatus for fabricating cushioning material of the present invention.

The cushioning material of the present invention may be prepared in any known manner. FIG. 5 illustrates one example of an apparatus, which is known per se, useful for producing the cushioning material. The first composite film 10 is continuously fed to a heat roller 14 where it is heated to a suitable temperature. The heated film 10 is then fed on an embossing cylinder 16 having a plurality of depressions 17 of any desired configuration distributed on its circumference. The depressions 17 are connected to a vacuum means (not shown) so that the heated film 10 on the embossing cylinder 16 is embossed. The embossed film 21 is then brought into pressure contact with the second composite film 11 during its passage through a nip and heat roller 15 so that the two films are bonded to form a unitary sheet having a plurality of sealed embossments 8. The laminate is then passed about a cooling roller 18 and is guided onto a spool 19.

The composite films 10 and 11 may be prepared in any known manner such as by co-extrusion, bonding with a suitable adhesive resin, e.g. polyethylene, polypropylene, ethyleneacrylate copolymer, polybutadiene or polyisoprene, or fuse bonding without using any adhesive.

The cushioning material according to the present invention, which is composed of laminated composite films each having a polyamide layer, has excellent gas barrier property, heat resistance and mechanical strength. Whilst the polyamide layer has a tendency to absorb moisture vapor, the presence of the polyolefin layers on both sides thereof can protect the cushioning material from deterioration in cushioning properties. Further, though a polyamide resin is relatively expensive, the overlying polyolefin layers permits the use of a very thin polyamide layer. This is advantageous from the stand point of economy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A cushioning material comprising first and second composite films, each film including an intermediate layer formed of a polyamide resin and a surface layer laminated on each side of said intermediate layer, each surface layer being formed of a polyolefin resin, at least one of said first and second composite films being formed to provide one or more discrete embossments, and said first and second composite films being bonded to form a substantially unitary structure and to seal said embossments so that one or more air-tight cells are defined between said first and second composite films, said polyamide resin including an aromatic polyamide resin selected from the group consisting of (a) a first product obtained by polycondensing m-xylylenediamine with adipic acid, (b) a second product obtained by polycondensing m-xylylenediamine with a mixture of dicarboxylic acids composed of 55–70 mol % of adipic acid, 20–30 mol % of isophthalic acid and 5–20 mol % of terephthalic acid, the total amount of the isophthalic acid and terephthalic acid in said mixture being in the range of 30–45 mol % and (c) a blend of 60–40% by weight of said first product (a) and 40–60% by weight of said second product (b), and nylon-6 in an amount of 10–90% by weight of said aromatic polyamide resin, and said polyolefin resin being a member selected from the group consisting of low density polyethylenes, copolymers of ethylene and an α-olefin and mixtures thereof.

2. A cushioning material according to claim 1, wherein said polyolefin resin is a mixture of 30–70% by weight of the low density polyethylene and 70–30% by weight of the ethylene/α-olefin copolymer.

3. A cushioning material according to claim 2, wherein said ethylene/α-olefin copolymer has an α-olefin content of 1–15 mole %.

4. A cushioning material according to claim 2, wherein said α-olefin is butene-1.

* * * * *